(12) United States Patent
Zhao et al.

(10) Patent No.: US 9,804,714 B2
(45) Date of Patent: Oct. 31, 2017

(54) CONTROL METHOD AND DEVICE FOR TOUCH DISPLAY PANEL, AND DISPLAY DEVICE

(71) Applicants: BOE TECHNOLOGY GROUP CO., LTD., Beijing (CN); BEIJING BOE OPTOELECTRONICS TECHNOLOGY GROUP CO., LTD., Beijing (CN)

(72) Inventors: Weijie Zhao, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/355,096

(22) PCT Filed: May 30, 2013

(86) PCT No.: PCT/CN2013/076503
§ 371 (c)(1),
(2) Date: Apr. 29, 2014

(87) PCT Pub. No.: WO2014/153832
PCT Pub. Date: Oct. 2, 2014

(65) Prior Publication Data
US 2015/0002462 A1  Jan. 1, 2015

(30) Foreign Application Priority Data

Mar. 29, 2013 (CN) .......................... 2013 1 0109617

(51) Int. Cl.
*G06F 3/044* (2006.01)
*G02F 1/1333* (2006.01)

(52) U.S. Cl.
CPC .......... *G06F 3/044* (2013.01); *G02F 1/13338* (2013.01); *G06F 2203/04111* (2013.01)

(58) Field of Classification Search
USPC ......................................................... 345/174
See application file for complete search history.

(56) References Cited

U.S. PATENT DOCUMENTS

2010/0194695 A1* 8/2010 Hotelling .............. G06F 3/0412
345/173
2012/0044195 A1* 2/2012 Nakanishi et al. .......... 345/174
(Continued)

FOREIGN PATENT DOCUMENTS

| CN | 102109690 A | 6/2011 |
|---|---|---|
| CN | 102419669 A | 4/2012 |
| CN | 202838292 U | 3/2013 |

OTHER PUBLICATIONS

First Chinese Office Action Appln. No. 201310109617.2; dated May 25, 2015.
(Continued)

*Primary Examiner* — Jennifer Mehmood
*Assistant Examiner* — Deeprose Subedi
(74) *Attorney, Agent, or Firm* — Ladas & Parry LLP

(57) ABSTRACT

The embodiments of the present disclosure disclose a control method and device for a touch display panel, and a display device, capable of achieving a display function and a touch control function of a display panel and improving the report rate for the touch control function. An embodiment of the disclosure discloses a control method for achieving a display function and a touch control function of an in-cell capacitive touch display panel, wherein the controlling method includes: dividing a time period for the in-cell capacitive touch display panel displaying each image frame into at least two control periods each comprising a display period and a touch control period; during the display period, applying no signal or applying signals for display to touch driving electrodes of the touch display panel; and during the touch control period, applying touch driving signals to the touch driving electrodes in sequence, wherein touch sensing electrodes couple voltage signals of the touch driving signals and output the same.

10 Claims, 3 Drawing Sheets

(56) References Cited

U.S. PATENT DOCUMENTS

| | | | |
|---|---|---|---|
| 2012/0075239 A1 | 3/2012 | Azumi et al. | |
| 2013/0314369 A1* | 11/2013 | Liu | G06F 3/0412 345/174 |
| 2013/0335367 A1* | 12/2013 | Kim | G09G 3/3696 345/174 |
| 2014/0015770 A1* | 1/2014 | Lee | 345/173 |
| 2014/0111476 A1* | 4/2014 | You | G09G 3/3655 345/174 |
| 2014/0146246 A1* | 5/2014 | Ma | G06F 3/0412 349/12 |
| 2014/0160061 A1* | 6/2014 | Kim | G02F 1/13338 345/174 |
| 2016/0011705 A1* | 1/2016 | Huang | G06F 3/044 345/174 |

OTHER PUBLICATIONS

International Preliminary Report on Patentability dated Sep. 29 2015; PCT/CN2013/076503.

* cited by examiner

CONTROL METHOD AND DEVICE FOR TOUCH DISPLAY PANEL, AND DISPLAY DEVICE

TECHNICAL FIELD

The present disclosure relates to a field of liquid crystal technique, and particularly to a control method and device for an in-cell capacitive touch display panel, and a display device.

BACKGROUND

The conventional touch display panel has a basic configuration comprising a display panel (for example, a liquid crystal panel) and a touch screen arranged outside of the display panel. As shown in FIG. 1, the liquid crystal panel comprises an array substrate 13 and an opposite substrate 11 which are arranged opposite to each other, wherein a liquid crystal layer 12 is filled therebetween; a touch screen 14 is bonded to the outside of the liquid crystal panel, and as a result, the conventional touch display panel is formed. Herein, the color filter layer of the liquid crystal panel can be manufactured on the opposite substrate 11 to form a color filter substrate, and can also be manufactured on the array substrate 13 directly.

Nevertheless, since the touch screen is arranged outside of the display panel, an add-on touch panel is thicker, which does not conform to the trend of the display device towards thinness, and thus it is a trend to adopt an in-cell touch panel in a portable display device, that is, the touch configuration is integrated inside the display panel.

For the in-cell touch display panel, both a touch control driving portion and a display driving portion are included therein; in the driving and controlling for the existing in-cell capacitive touch display panel, the report rate is not high, rendering a low touch control accuracy.

SUMMARY

In the embodiments of the present disclosure, a control device and method for an in-cell capacitive touch display panel, and a display device are provided, which are capable of achieving a display function and a touch control function of a display panel and improving the report rate for the touch control function.

In an embodiment of the disclosure, there is provided a control method for achieving a display function and a touch control function of an in-cell capacitive touch display panel, wherein the control method comprises:

dividing a time period for the in-cell capacitive touch display panel displaying each image frame into at least two control periods each comprising a display period and a touch control period;

during the display period, applying no signal or applying signals for display to touch driving electrodes of the touch display panel; and during the touch control period, applying touch driving signals to the touch driving electrodes in sequence, wherein touch sensing electrodes couple voltage signals of the touch driving signals and output the same.

In an embodiment of the present disclosure, there is further provided a control device for the above in-cell capacitive touch display panel for display and touch control by the control method, wherein the control device comprises:

a display control unit, for applying no signal or applying signals for display to the touch driving electrodes of the touch display panel during the display period;

a touch control unit, for applying touch driving signals to the touch driving electrodes in sequence during the touch control period, wherein the touch sensing electrodes couple voltage signals of the touch driving signals and output the same;

a clock unit, for dividing a time period for the in-cell capacitive touch display panel displaying each image frame into at least two control periods each comprising a display period and a touch control period; the clock unit is further used for sending a trigger signal for display to the display control unit upon entering into the display period, and for sending a trigger signal for touch control to the touch control unit upon entering into the touch control period.

In an embodiment of the present disclosure, there is provided a capacitive touch display device comprising the above control device.

In the control device and method for the in-cell capacitive touch display panel and the display device provided in the embodiments of the present disclosure, the time period for the in-cell capacitive touch display panel displaying each image frame is divided into at least two control periods each comprising a display period and a touch control period, and during the display period, no signal is applied or signals for display are applied to touch driving electrodes of the touch display panel; and during the touch control period, touch driving signals are applied to the touch driving electrodes in sequence, wherein touch sensing electrodes couple voltage signals of the touch driving signals and output the same, so that the display function and the touch control function are realized, and thus the report rate is increased and the touch control accuracy is improved.

DETAILED DESCRIPTION OF THE PREFERRED EMBODIMENTS

In embodiments of the present disclosure, there are provided an in-cell capacitive touch display panel, a display device, a control device and method, for achieving a display function and a touch control function of a display panel and improving the report rate for the touch control function.

Hereinafter, the embodiments of the present disclosure are described in detail in connection with the accompanying drawings. It should be noted that the accompanying drawings are only the schematic diagrams for structure and are used for illustrating the embodiments of the present disclosure clearly, not limiting the scope of the present disclosure in any way.

Figure 5:
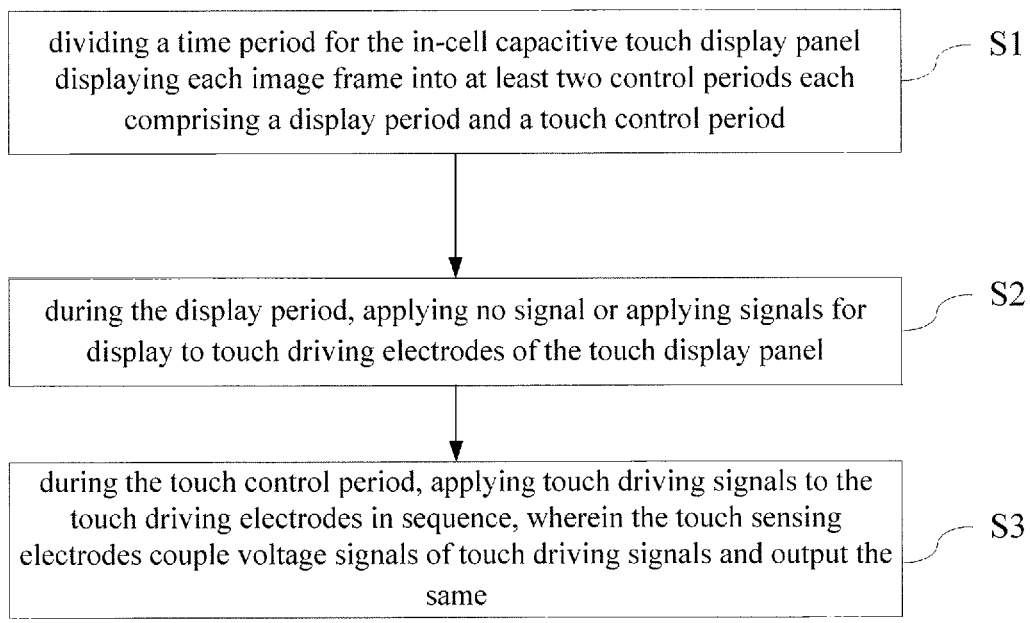
FIG. 5 is a schematic flowchart of a control method for achieving the display function and the touch control function of the in-cell capacitive touch display panel provided in an embodiment of the present disclosure.

As shown in FIG. 5, in an embodiment of the present disclosure, there is provided a control method for achieving a display function and a touch control function of an in-cell capacitive touch display panel, wherein the control method comprises:

S1, dividing a time period for the in-cell capacitive touch display panel displaying each image frame into at least two control periods each comprising a display period and a touch control period;

S2, during the display period, applying no signal or applying signals for display to touch driving electrodes of the touch display panel; and S3, during the touch control period, applying touch driving signals to the touch driving electrodes in sequence, wherein the touch sensing electrodes couple voltage signals of touch driving signals and output the same.

During the above procedures, there is no limitation on the specific order in performing the steps S1, S2 and S3; for example, the step S1 can be performed once in the initial phase of the driving and controlling, after that, as long as the steps S2 and S3 are performed alternatively.

In particular, at the step S2, applying no signal or applying signals for display to the touch driving electrodes of the touch display panel during the display period comprises:

applying no signal to the touch driving electrodes of the touch display panel during the display period in a case where the touch driving electrodes, gate lines, date lines and common electrodes of the touch display panel are arranged in different layers;

using gate scanning signals as the signals for display and applying the gate scanning signals to the touch driving electrodes during the display period in a case where some of gate lines of the touch display panel serve as the touch driving electrodes;

using image data signals as the signals for display and applying the image data signals to the touch driving electrodes during the display period in a case where some of data lines of the touch display panel serve as the touch driving electrodes; and using common voltage signals as the signals for display and applying the common voltage signals to the touch driving electrodes during the display period in a case where some of strip-shaped common electrodes of the touch display panel serve as the touch driving electrodes.

In the above method, during the at least two control periods, respective control periods are equal to each other in length; during different control periods, respective display periods are equal in length, and respective touch control periods are equal in length.

Next, a control method for the above capacitive touch display panel is illustrated in detail with reference to an in-cell capacitive touch display panel shown in FIG. 2.

Figure 1:
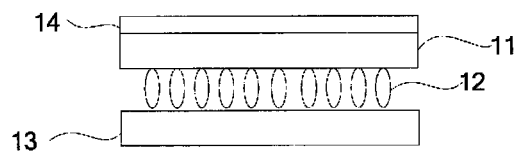
FIG. 1 is a schematic diagram of a sectional structure of an in-cell capacitive touch display panel in the prior art.
Figure 2:
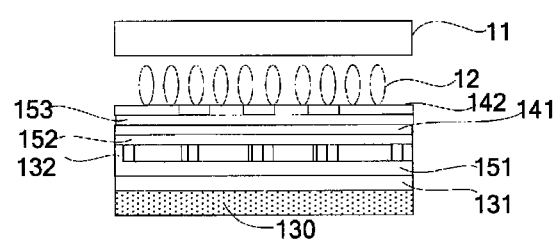
FIG. 2 is a schematic diagram of a sectional structure of an in-cell capacitive touch display panel provided in an embodiment of the present disclosure.

In particular, the in-cell capacitive touch display panel shown in FIG. 2 comprises an opposite substrate 11, an array substrate, and a liquid crystal layer 12 located between the opposite substrate 11 and the array substrate; wherein the array substrate comprises gate lines 131 and data lines 132 manufactured on a glass substrate 130 which are intersected with each other in arrangement, wherein the gate lines 131 and the date lines 132 are arranged in different layers, and a first isolating layer 151 is arranged therebetween; the array substrate further comprises: touch driving electrodes 141 and touch sensing electrodes 142 which are both located between the liquid crystal layer 12 and the data lines 132, a second isolating layer 152 located between the data lines 132 and the touch driving electrodes 142, and a third isolating layer 153 located between the touch driving electrodes 141 and the touch sensing electrodes 142; wherein the touch driving electrodes 141 are extended in a first direction, and are located between the second isolating layer 152 and the third isolating layer 153; and the touch sensing electrodes 142 are extended in a second direction, and the touch sensing electrode 142 and the touch driving electrodes 141 are separated by the third isolating layer 153;

wherein the first direction is perpendicular to the second direction, that is, the direction in which the touch driving electrodes 141 are extended is perpendicular to that in which the touch sensing electrodes 142 are extended.

Figure 3:
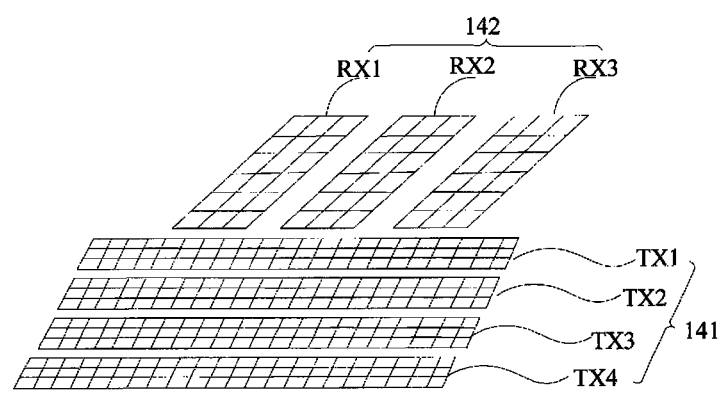
FIG. 3 is a schematic diagram of layer structures formed by touch sensing electrodes and touch driving electrodes provided in an embodiment of the present disclosure.

Optionally, the touch sensing electrodes 142 and the touch driving electrodes 141 can be made by transparent conductive material, for example, indium tin oxide ITO, so that the wiring of the touch sensing electrodes and the touch driving electrodes has no influence on the aperture ratio of the touch display panel. If the touch driving electrodes 141 and/or the touch sensing electrodes 142 are made by metal material, optionally, the touch driving electrodes 141 and/or the touch sensing electrodes 142 may be electrodes which are arranged in a grid-shaped structure, and as shown in FIG. 3, and the electrodes in the grid-shaped structure correspond to black array areas on the touch display panel, so as to prevent the wiring of the touch sensing electrodes 142 and the touch driving electrodes 141 from affecting the aperture ratio of the touch display panel adversely. The density of the grids depends on the display accuracy of the display panel, and thus different requirements on the touch control accuracy can be met by adjusting the density of the grids.

Further, referring to the layer structure shown in FIG. 3, the touch sensing electrodes 142 comprise a plurality of touch sensing sub-electrodes, and the touch driving electrodes 141 comprise a plurality of touch driving sub-electrodes; wherein, respective touch sensing sub-electrodes RX1, RX2, RX3, etc are intersected with respective touch driving sub-electrodes TX1, TX2, TX3, TX4, etc in arrangement, and a capacitor is formed at an intersection.

Figure 4:
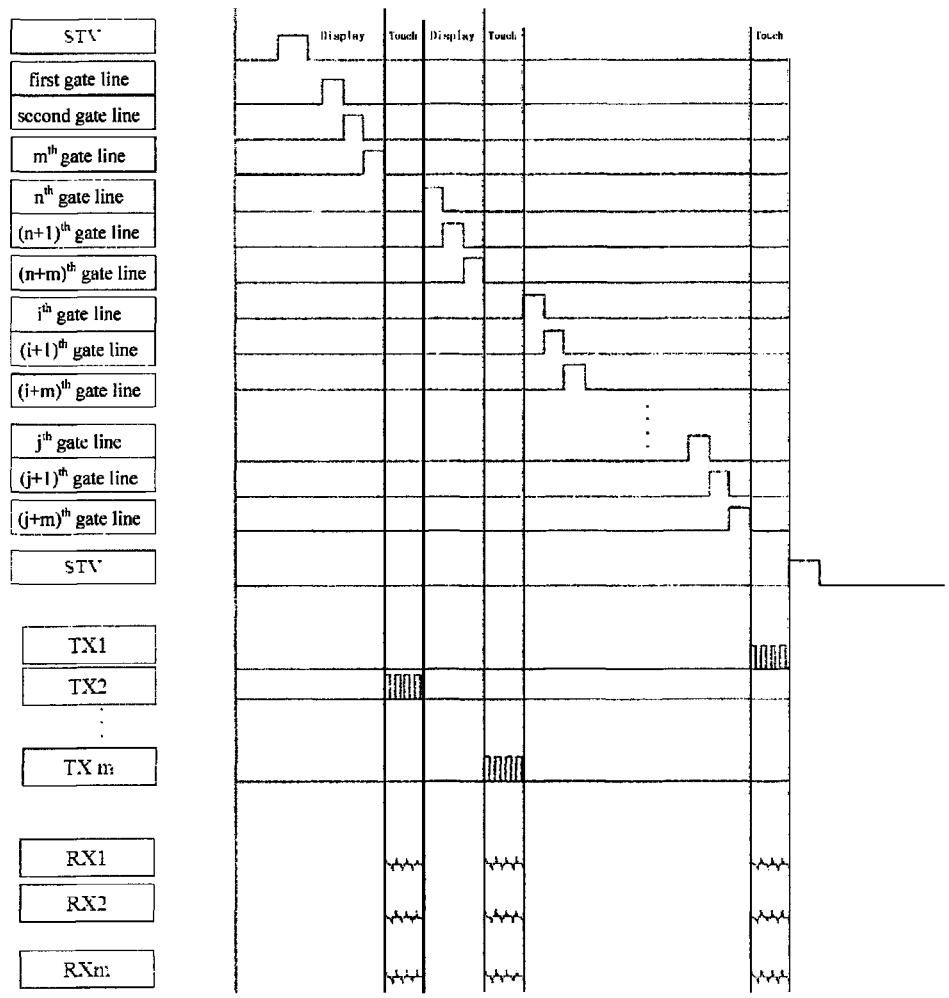
FIG. 4 is a timing diagram of signals at respective signal terminals during the procedures for driving the display panel provided in an embodiment of the present disclosure.

Next, the control method for achieving the display and the touch control of the display panel provided in the embodiments of the present disclosure will be described in detail by taking the capacitive touch display panel shown in FIGS. 2 and 3 as an example and referring to the timing diagram of the signals at respective signal terminals shown in FIG. 4. As shown in FIG. 4, STV represents a start-up signal for an image frame, and the time period of an image frame is divided into a plurality of control periods each comprising a display period Display and a touch control period Touch respectively, wherein each group of the display period and the touch control period is subsequent to each other in time; the respective display periods are equal in length, and the respective touch control periods are equal in length. Each display period corresponds to a group of gate lines, and each group of gate lines comprises different gate lines; optionally, different groups of gate lines comprise gate lines in the same number.

During the display period Display, the gate lines in a group of gate lines receive the gate scanning signals respectively in sequence, and the data lines output corresponding data signals; as shown in FIG. 4, m gate lines form one group, and during the display period for a first group, the first gate line to the $m^{th}$ gate line are activated in sequence, and the corresponding data signals are output from the data lines respectively; meanwhile, the common voltage signals are output from the common electrodes, so that electric fields are formed between the pixel electrodes and the common electrodes to control the liquid crystal molecules of the corresponding pixel unit to be deflected, for achieving the display of a picture.

During the touch control period Touch, a touch driving signal (for example, a high frequency signal) is applied to at least one touch driving sub-electrode, and a touch sensing signal (for example, a direct current signal) is imported to a corresponding touch sensing sub-electrode; as shown in FIG. 4, during the touch control period for the first group, the touch driving sub-electrode TX2 is controlled to receive the touch driving signal, and the touch sensing signal is imported to all the corresponding touch sensing sub-electrodes. After a touch action is sensed by a touch sensing sub-electrode RX, a coupling signal is generated, and the coupling signal is superposed on the touch sensing signal (i.e., the direct current signal) and is output from the touch sensing sub-electrode to an external detecting circuit. During the touch control period for one group, there is no limitation on the number of the touch driving sub-electrodes and that of the touch sensing sub-electrodes, as long as it can be ensured that all the touch driving sub-electrodes and all the touch sensing sub-electrodes can achieve at least one report completely during a whole image frame. Naturally, a plurality of reports can increase the report rate, and thus improves the touch control accuracy. Therefore, the scan frequency of the touch driving signals can be determined by the different touch control accuracy and the specific parameters of the display panel.

The display period and the touch control period are alternated in sequence, and until the display period for a last group, during with the $j^{th}$ gate line to the $(j+m)^{th}$ gate line (the last gate line) are activated sequentially, and the whole image frame is displayed completely; during the touch control period for the last group, at least one touch driving sub-electrode is scanned for touch control function, as mentioned above, as long as at least one report can be achieved during the period for an image frame.

The control method for the in-cell capacitive touch display panel is introduced in connection with FIGS. 2 and 3. It can be seen from FIG. 2 that the touch driving electrodes, the gate lines, the data lines, the common electrodes of the touch display panel are arranged in different layers, that is, the touch driving electrodes are arranged in a new layer structure independently arranged on the array substrate; in this case, the touch driving and the display driving are controlled by different driving chips respectively. During the display period, there is no need for applying an electric signal to the touch driving electrodes so as to avoid generating the crosstalk on the normal display for the picture; during the touch control period, the normal gate scanning signals and the image data signals are stopped to be input to the gate lines and the data lines respectively, and the corresponding touch control signals are applied to the touch driving electrodes and the touch sensing electrodes.

Further, in order to reduce the process for manufacturing the in-cell capacitive touch display panel, the touch driving electrodes can be manufactured in a gate metal layer or source-drain metal layer. In particular, some of gate lines or some of data lines can serve as the touch driving electrodes.

In the case where some of gate lines serve as the touch driving electrodes, the gate scanning signals are applied to the touch driving electrodes during the display period, and the touch driving signals are applied to the touch driving electrodes during the touch control period; in the case where some of data lines serve as the touch driving electrodes, the image data signals are applied to the touch driving electrodes during the display period, and the touch driving signals are applied to the touch driving electrodes during the touch control period.

Further, for a display panel in Advanced Super Dimension Switch (ASDS) mode, two layers of transparent electrodes are arranged on the array substrate of the display panel, and a multiple-dimensional electric field is formed by the electric field generated between edges of slit electrodes in a same plane and the electric field generated between a slit electrode layer and a plate electrode layer, so that the liquid crystal molecules between the slip electrodes and those right above the electrodes in the liquid crystal cell all can be deflected, thus improving the operation efficiency of the liquid crystal layer and increasing the transmittance efficiency. In the capacitive touch display panel based on the display panel in ADS mode, the touch driving electrodes can be manufactured in a second layer of transparent electrodes of the array substrate (the layer of transparent electrodes close to the liquid crystal layer). In this case, if the second layer of transparent electrodes serves as a layer of common electrodes, the layer of common electrodes can be divided into a plurality of strip-shaped common electrodes, and some of the plurality of strip-shaped common electrodes are selected as serving as the touch driving electrodes; the common voltage signals are applied to the touch driving electrodes during the display period, and the touch driving signals are applied to the touch driving electrodes during the touch control period.

By means of the control method in a time-division mode, the dual functions of the display panel, i.e., the display function and the touch control function, can be realized; meanwhile, the interference of the touch control signals on the display signals can be avoided due to the time-division control, thus improving the display quality. More important thing is that, by dividing the time of each image frame into at least two control periods each comprising a group of a display period and a touch control period, the time interval between two touch control periods can be shortened significantly, and the touch action occurring on the surface of the touch display panel can be reacted in time, thus increasing the report rate and improving the touch control accuracy.

In the embodiments of the present disclosure, there is further provided a control device for the above in-cell capacitive touch display panel for display and touch control by the control method, wherein the control device comprises:

a display control unit, for applying no signal or applying signals for display to the touch driving electrodes of the touch display panel during the display period;

a touch control unit, for applying touch driving signals to the touch driving electrodes in sequence during the touch control period, wherein the touch sensing electrodes couple the voltage signals of the touch driving signals and output the same;

a clock unit, for dividing the time period for the in-cell capacitive touch display panel displaying each image frame into at least two control periods each comprising a display period and a touch control period; the clock unit is further used for sending a trigger signal for display to the display control unit upon entering into the display period, and for sending a trigger signal for touch control to the touch control unit upon entering into the touch control period.

Optionally, in a case where the touch driving electrodes, gate lines, date lines and common electrodes of the touch display panel are arranged in different layers, the display control unit applies no signal to the touch driving electrodes of the touch display panel during the display period;

in a case where some of gate lines of the touch display panel serve as the touch driving electrodes, gate scanning signals are used as the signals for display, and the display control unit applies the gate scanning signals to the touch driving electrodes during the display period;

in a case where some of data lines of the touch display panel serve as the touch driving electrodes, image data signals are used as the signals for display, and the display control unit applies the image data signals to the touch driving electrodes during the display period; and in a case where some of strip-shaped common electrodes of the touch display panel serve as the touch driving electrodes, common voltage signals are used as the signals for display, and the display control unit applies the common voltages signals to the touch driving electrodes during the display period.

Optionally, during the at least two control periods, respective control periods are equal to each other in length; during different control periods, respective display periods are equal in length, and respective touch control periods are equal in length.

In addition, in the embodiments of the present disclosure, there is further provided a capacitive touch display device comprising the control device as described in the above embodiments. Moreover, the display device performs display and touch control by means of the above method so as to achieve the display and touch control function.

Further, the capacitive touch display device comprises an array substrate on which gate lines and data lines are formed; the display period in each control period corresponds to a group of gate lines, wherein each group of gate lines comprises different gate lines. Optionally, each group of gate lines comprises gate lines in the same number.

In summary, in the embodiments of the disclosure, there are provided a control device and method for an in-cell capacitive touch display panel and a display device, wherein by the time-division driving method, the time period for each image frame is divided into at least one group of a display period and a touch control period, so that at least one report can be realized during the touch control period of each image frame, thus improving the report rate and increasing the touch control accuracy. In addition, in the technical solutions provided in the embodiments of the present disclosure, the touch sensing electrodes and the touch driving electrodes are arranged on the array substrate, so that on one hand, the display area would not be occupied since the positions of the touch sensing electrodes and the touch driving electrodes correspond to the areas of the gate lines and the data lines, thus retaining the aperture ratio of the original pixel structure; on the other hand, it will benefit the leading-out of the pins of the touch sensing electrodes and the touch driving electrodes, and in turn benefits the bonding of the Flexible Printed Circuit FPC board.

Those skilled in the art should understand that the embodiments of the present disclosure can be implemented in a method, system or computer program product. Therefore, the embodiments of the present disclosure can be realized in complete hardware, complete software, or a combination of the software with the hardware. Further, the embodiments of the present disclosure can be implemented in a computer program product in a form of a computer readable storage medium comprising computer readable program codes (comprising, but is not limited to magnetic disk storage, the optical storage, and the like).

The embodiments of the disclosure are described with reference to the flowcharts and/or the block diagrams of the method, device (system), and the computer program product. It should be appreciated that each of flows and/blocks in the flowchart and/or the block diagram, as well as the combination of the flows and/or the blocks in the flowchart and/or block diagram can be implemented in the computer program instructions. The computer program instructions can be supplied to the general computers, the dedicated computers, the embedded processors or the processors in the other programmable data processing devices to generate a machine, so that the instructions executed by the general computers or the processors in the other programmable data processing devices generate a device for realizing the functions specified in one or more flows in the flowchart and/or one or more blocks in the block diagram.

The computer program instructions can be stored in a computer readable memory capable of booting the computers or other programmable data processing devices to operate in a specific mode, so that the instructions stored in the computer readable memory generate a product comprising an instruction mean. The instruction mean can achieve the functions specified in one or more flows in the flowchart and/or one or more blocks in the block diagram.

The computer program instructions can be loaded into the computers or other programmable data processing devices to cause the computers or other programmable data processing devices perform a series of operational steps for generating process realized by the computers, so that the instructions executed in the computers or other programmable devices can provide the steps for realizing the functions specified in one or more flows in the flowchart and/or one or more blocks in the block diagram.

Obviously, those skilled in the art may make modifications, variations and equivalences on the above embodiments without departing from the spirit and scope of the present disclosure as defined by the following claims. Such variations and modifications are intended to be included within the spirit and scope of the present disclosure provided that such variations and modifications belong to the scope defined in the claims and the equivalences thereof.

What is claimed is:

1. A control device for an in-cell capacitive touch display panel for display and touch, comprising:
   a display control unit configured for, during a display period, applying gate scanning signals to the touch driving electrodes in a case where some of gate lines of the touch display panel serve as the touch driving electrodes;
   a touch control unit, for applying touch driving signals to the touch driving electrodes in sequence during a touch control period, wherein the touch sensing electrodes couple voltage signals of the touch driving signals and output the same;
   a clock unit, for dividing a time period for displaying each image frame into at least two control periods, each control period comprising the display period and the touch control period so that the time period for displaying each image frame includes at least two display periods and at least two touch control periods; the clock unit further for sending a trigger signal for display to the display control unit upon entering into the display period, and for sending a trigger signal for touch control to the touch control unit upon entering into the touch control period.

2. The control device of claim 1, wherein said in the at least two control periods, respective control periods are equal to each other in length; in different control periods, respective display periods are equal in length, and respective touch control periods are equal in length.

3. A capacitive touch display device comprising the control device of claim 1.

4. The capacitive touch display device of claim 3, wherein said in the at least two control periods, respective control periods are equal to each other in length; in different control periods, respective display periods are equal in length, and respective touch control periods are equal in length.

5. The capacitive touch display device of claim 3, wherein the capacitive touch display device comprises an array substrate on which gate lines and data lines are formed;
the display period in each control period corresponds to a group of gate lines, wherein each group of gate lines comprises different gate lines.

6. The capacitive touch display device of claim 4, wherein the capacitive touch display device comprises an array substrate on which gate lines and data lines are formed;
the display period in each control period corresponds to a group of gate lines, wherein each group of gate lines comprises different gate lines.

7. The capacitive touch display device of claim 5, wherein each group of gate lines comprises gate lines in a same number.

8. The capacitive touch display device of claim 6, wherein each group of gate lines comprises gate lines in a same number.

9. A control method for achieving a display function and a touch control function of an in-cell capacitive touch display panel, comprising:
dividing a time period for displaying each image frame into at least two control periods, each control period comprising a display period and a touch control period so that the time period for displaying each image frame includes at least two display periods and at least two touch control periods;
during each display period, applying gate scanning signals to the touch driving electrodes in a case where some of gate lines of the touch display panel serve as the touch driving electrodes; and
during each touch control period, applying touch driving signals to the touch driving electrodes in sequence, wherein the touch sensing electrodes couple voltage signals of touch driving signals and output the same.

10. The control method of claim 9, wherein in the at least two control periods, respective control periods are equal to each other in length;
in different control periods, respective display periods are equal in length, and respective touch control periods are equal in length.

* * * * *